United States Patent
Godfrey

(10) Patent No.: US 9,107,106 B2
(45) Date of Patent: Aug. 11, 2015

(54) TECHNIQUES FOR REDUCING BUFFER OVERFLOW IN A COMMUNICATION SYSTEM

(71) Applicant: Apple Inc., Cupertino, CA (US)

(72) Inventor: Tim G. Godfrey, Overland Park, KS (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/873,071

(22) Filed: Apr. 29, 2013

(65) Prior Publication Data

US 2014/0050080 A1    Feb. 20, 2014

Related U.S. Application Data

(63) Continuation of application No. 12/058,345, filed on Mar. 28, 2008, now Pat. No. 8,432,810.

(51) Int. Cl.
| | |
|---|---|
| *H04W 28/12* | (2009.01) |
| *H04W 72/04* | (2009.01) |
| *H04W 28/10* | (2009.01) |
| *H04L 12/801* | (2013.01) |
| *H04L 12/825* | (2013.01) |
| *H04L 12/841* | (2013.01) |
| *H04L 12/835* | (2013.01) |
| *H04W 28/14* | (2009.01) |
| *H04W 28/22* | (2009.01) |

(52) U.S. Cl.
CPC .............. *H04W 28/10* (2013.01); *H04L 47/10* (2013.01); *H04L 47/14* (2013.01); *H04L 47/263* (2013.01); *H04L 47/283* (2013.01); *H04L 47/30* (2013.01); *H04W 28/14* (2013.01); *H04W 28/22* (2013.01)

(58) Field of Classification Search
None
See application file for complete search history.

(56) References Cited

U.S. PATENT DOCUMENTS

| | | |
|---|---|---|
| 5,488,609 A | 1/1996 | Hluchyj et al. |
| 5,623,495 A | 4/1997 | Eng et al. |
| 6,134,607 A | 10/2000 | Frink |
| 6,192,406 B1 | 2/2001 | Ma et al. |
| 6,282,206 B1 | 8/2001 | Hindus et al. |
| 6,330,286 B1 | 12/2001 | Lyons |
| 6,377,550 B1 | 4/2002 | Prasad |
| 6,434,636 B1 | 8/2002 | Van Gaasbeck |
| 6,442,613 B1 | 8/2002 | Gregg et al. |
| 6,459,903 B1 | 10/2002 | Lee |
| 6,606,666 B1 | 8/2003 | Bell, Jr. et al. |
| 6,631,118 B1 | 10/2003 | Jones |
| 6,681,254 B1 | 1/2004 | Gregg et al. |
| 6,693,880 B2 | 2/2004 | Gregg et al. |
| 6,801,964 B1 | 10/2004 | Mahdavi |
| 6,832,326 B2 | 12/2004 | Kubo et al. |
| 6,839,768 B2 * | 1/2005 | Ma et al. ............... 709/235 |
| 6,850,965 B2 | 2/2005 | Allen |
| 6,854,017 B2 | 2/2005 | Gregg et al. |
| 6,904,596 B1 | 6/2005 | Clark et al. |
| 2001/0032269 A1 | 10/2001 | Wilson |

(Continued)

*Primary Examiner* — Omar Ghowrwal
(74) *Attorney, Agent, or Firm* — Meyertons, Hood, Kivlin, Kowert & Goetzel, P.C.

(57) ABSTRACT

A technique for operating a wireless communication device includes transmitting a first downlink rate in a first control message. The first downlink rate is based on a latency of an inter-processor communication link associated with the wireless communication device. First downlink data at the first downlink rate is then received for a first time period. Following the first time period, second downlink data is received at a second downlink rate that is higher than the first downlink rate.

13 Claims, 11 Drawing Sheets

(56) References Cited

U.S. PATENT DOCUMENTS

| | | | |
|---|---|---|---|
| 2003/0037178 A1* | 2/2003 | Vessey et al. | 709/319 |
| 2004/0203973 A1* | 10/2004 | Khan | 455/517 |
| 2004/0246897 A1 | 12/2004 | Ma et al. | |
| 2005/0091436 A1 | 4/2005 | Huang | |
| 2006/0256758 A1* | 11/2006 | Malkamaki et al. | 370/335 |
| 2007/0183424 A1 | 8/2007 | Ametsitsi | |
| 2008/0013528 A1 | 1/2008 | Miller et al. | |
| 2008/0282063 A1 | 11/2008 | Hatakeyama | |
| 2010/0238872 A1* | 9/2010 | Kim et al. | 370/329 |

* cited by examiner

TECHNIQUES FOR REDUCING BUFFER OVERFLOW IN A COMMUNICATION SYSTEM

PRIORITY

This patent application is a continuation of and claims priority to co-owned U.S. patent application Ser. No. 12/058,345 entitled "TECHNIQUES FOR REDUCING BUFFER OVERFLOW IN A COMMUNICATION SYSTEM" filed Mar. 28, 2008, issuing as U.S. Pat. No. 8,432,810, the forgoing being incorporated herein by reference in its entirety.

BACKGROUND

1. Field

This disclosure relates generally to a communication system and, more specifically, to techniques for reducing buffer overflow in a communication system.

2. Related Art

In emerging wireless communication systems, such as third generation partnership project long-term evolution (3GPP LTE) systems, downlink rates are generally an order of magnitude faster than legacy wireless communication systems. In a number of different wireless communication systems, data transferred from a serving base station (BS) to user equipment (or a subscriber station (SS)) is buffered in a memory of the SS prior to further processing of the data. In various situations, data stored in a buffer (of an SS) may overflow before further processing of the buffered data is initiated.

A number of different conventional approaches may be employed to reduce buffer overflow occurrences in an SS. For example, a buffer size for an SS may be selected to be a relatively large size. Unfortunately, increasing a buffer size of an SS increases a cost of the SS and generally reduces marketplace competitiveness of the SS. As another example, a maximum downlink rate of an SS may be reduced (e.g., by lowering a maximum downlink rate capability parameter in an SS capability class in an LTE compliant SS). However, reducing a maximum downlink rate of an SS also generally reduces marketplace competitiveness of the SS and limits performance of the SS. As another example, conventional flow control may be employed to reduce buffer overflow occurrences in an SS. However, reducing buffer overflow occurrences in an SS using conventional flow control may require substantially immediate flow control signaling by the SS upon initial receipt of data (to reduce a data transmission rate of a serving BS). Unfortunately, flow control signaling by an SS may be subject to delays in obtaining an uplink channel and, as such, any reduction in flow rate attributable to the flow control signaling may not prevent buffer overflow in the SS.

SUMMARY

Firstly, a method of operating a wireless communication device is disclosed. In one embodiment, the method includes: detecting a first event associated with an initiation of an operation on the wireless communication device, where the operation prevents the wireless communication device from being able to adequately service a current downlink rate, and when the first event is detected: transmitting a first flow control message to initiate a reduction in the current downlink rate; receiving an acknowledgement of the first flow control message; and based at least in part on the receiving of the acknowledgement, initiating the operation by the wireless communication device.

Secondly, a wireless communication device is disclosed. In one embodiment, the wireless communication device includes: a wireless interface, a processor in data communication with the wireless interface, and a computer readable apparatus having a non-transitory storage medium with at least one computer program stored thereon. In one variant, the at least one computer program is configured to, when executed, cause the wireless communication device to: detect a first event associated with initiation of an operation on the wireless communication device, and based at least in part on the detection: transmit a first flow control message to initiate a reduction m a current downlink rate; receive an acknowledgement of the first flow control message; and based on the reception of the acknowledgement, initiate the operation.

Thirdly, a base station device is disclosed. In one embodiment, the base station device includes: a wireless interface, a processor in data communication with the wireless interface, and a computer readable apparatus having a non-transitory storage medium with at least one computer program stored thereon. In one variant, the at least one computer program is configured to, when executed, cause the base station device to: receive a first control message transmitted from a subscriber station comprising a first value configured to reduce a current downlink rate to a first downlink rate. The first downlink rate is configured to prevent a buffer overflow associated with an initiation of an operation on the subscriber station; and transmit first downlink data at the first downlink rate.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
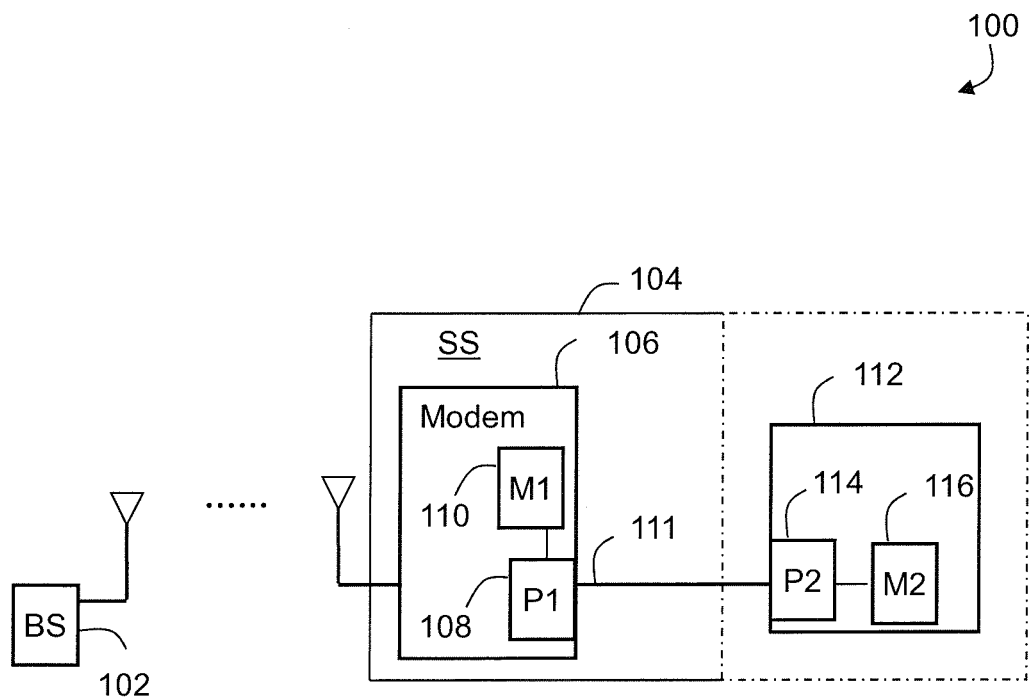
FIG. 1 is a diagram of an example wireless communication system that includes a serving base station (BS) in communication with a subscriber station (SS).

In the following detailed description of exemplary embodiments of the invention, specific exemplary embodiments in which the invention may be practiced are described in sufficient detail to enable those have ordinary skill in the art to practice the invention, and it should be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims and their equivalents. In particular, the embodiments described below may be embodied in various wired or wireless communication systems/devices.

As may be used herein, the term "channel" includes one or more subcarriers, which may be adjacent or distributed across a frequency band. Moreover, the term "channel" may include an entire system bandwidth or a portion of the entire system bandwidth. The term, "resource block," as may be used herein, includes a number of subcarriers (e.g., twelve subcarriers) which may or may not be adjacent. As is also used herein, the term "subscriber station" is synonymous with the terms "user equipment" and "user end," which include a wireless communication device that may (or may not) be mobile.

The disclosed techniques are contemplated to be applicable to systems that employ a wide variety of signaling, e.g., orthogonal frequency division multiplex (OFDM) or single-carrier frequency division multiple access (SC-FDMA) signaling, on uplink and/or downlink channels. A transmitter of an SS or serving BS may implement one of a phase shift keying (PSK), a quadrature amplitude modulation (QAM), or other data modulation scheme, depending upon which modulation scheme is scheduled. It should be appreciated that any of the various PSK (e.g., pi/2 BPSK, QPSK and 8-PSK) or QAM (e.g., 16-QAM and 64-QAM) modulation techniques may be implemented in a wireless communication system constructed according to the present disclosure.

In various situations, data stored in a buffer (of an SS) may overflow before processing of the buffered data is initiated. For example, even when a radio modem and protocol stack of an SS can handle a maximum downlink rate, the SS often has an associated inter-processor communication link (e.g., a link between a processor of the radio modem and another processor that consumes the data) that cannot initially prevent (e.g., due to latency in initializing the link) an associated buffer (that buffers the data) from overflowing. According to the present disclosure, a number of different techniques may be employed to reduce buffer overflow associated with latency of an inter-processor communication link associated with a communication device, such as an SS.

In various cases, conventional flow control signaling is inadequate to prevent buffer overflow at an SS. For example, when a high-rate data flow is transmitted from a serving BS to an SS, the SS may need to immediately transmit a flow control signal to the BS to request a reduction in the flow rate. However, in 3GPP systems (and in LTE systems in particular), an SS may experience a significant time delay between initiating upstream signaling (i.e., queuing a request for an uplink channel) and receiving an uplink grant for an uplink channel. For example, in an LTE compliant architecture, a normal signaling process requires invoking a random access channel (RACH) procedure, which can take tens of milliseconds or more to receive an uplink grant. During the time that an SS is waiting to receive an uplink grant, buffers of the SS may overflow. As noted above, setting a lower maximum downlink rate (e.g., using a maximum downlink rate capability parameter) is usually undesirable as classifying an SS in a lower SS capability category due to a transient limitation places the SS at a competitive disadvantage in the marketplace.

As noted above, in emerging wireless communication systems, such as LTE systems, typical downlink rates are an order of magnitude faster than previous standards. In this case, even when a radio modem and protocol stack can handle a maximum downlink rate, there is often an inter-processor communication link (between a processor in the radio modem and another processor that consumes the data) that cannot (due to latency in initializing the link) initially prevent an associated buffer (that buffers the data) from overflowing. For example, certain interfaces, such as a universal serial bus (USB) link, may experience significant latency (time delay) before data transfer begins on the link (due to, for example, a delay in servicing by a host operating system (OS), memory paging, etc.). In this situation, the buffers in the radio modem may overflow before the inter-processor communication link begins transferring received data.

According to various aspects of the present disclosure, an additional capability parameter, which indicates an initial downlink rate (or an initial percentage of a maximum downlink rate specified in a maximum downlink rate capability parameter) is employed to reduce buffer overflow occurrences. For example, in LTE compliant architectures, SS capability parameters are currently quantized in five SS categories, each of which have specific maximum downlink rates (ranging from 10 Mbits/sec to 300 Mbits/sec). According to the present disclosure, an initial downlink rate capability parameter (specific to a device capability) for an initial downlink rate is employed to reduce the occurrence of buffer overflow in an SS.

Using the disclosed techniques, an SS is not required to immediately signal a serving BS to reduce a downlink rate in an attempt to avoid buffer overflow. As such, the techniques disclosed herein are relatively immune to time delay constraints associated with obtaining an uplink grant (allocation). In a similar manner to how an initial downlink rate capability parameter may be specified to set an initial downlink rate, another parameter may be utilized to specify a maximum duration of the initial downlink rate (which compensates for transitory initial conditions). According to one or more embodiments of the present disclosure, a serving BS starts transmitting at an initial downlink rate (as specified in an SS capability parameter). In this case, when the SS has established the inter-processor communication link, the SS may then transmit a control message to the BS to increase the flow rate to, for example, the maximum downlink rate. If there is a delay in sending the message to the BS, the only downside is that the downlink rate remains lower for slightly longer time period. In this manner, data loss due to buffer overflow may be avoided. If a reduced flow duration parameter is employed, the SS may wait for the end of the reduced flow duration rather than contend for uplink signaling.

According to another aspect of the present disclosure, in the event a user of an SS initiates an operation (e.g., taking a picture with an integrated camera) that would tax local resources of the SS (such that the SS cannot handle a maximum downlink rate), a flow control message may be proactively issued to reduce the downlink rate prior to starting the resource-taxing operation. In this case, the resource-taxing operation may be delayed, e.g., using a software interlock, until the flow control message has actually been transmitted (or transmitted and acknowledged). When implemented, the interlock compensates for unpredictable delays in obtaining an uplink grant to transmit the flow control message. Traditionally, normal flow control operation has waited for buffers to fill to some threshold level to trigger a flow control message to reduce the downlink rate.

While a communication system that employs a transmission control protocol/Internet protocol (TCP/IP) includes a built-in "soft start" mechanism that reduces the need for the techniques disclosed herein, many applications (e.g., high-rate video streaming) are based on a user datagram protocol (UDP), which is unacknowledged and has no intrinsic flow control. In this case, the disclosed techniques optimize the use of UDP in various applications. Proactive flow control messaging based on internal operations of an SS are widely applicable to a number of different communication devices. For example, proactive flow control messaging may be employed in smart-phones and mobile multimedia devices that can accept a high-rate data downlink that taxes internal resources (e.g., processor(s) and memory) of the devices.

According to one embodiment of the present disclosure, a technique for operating a wireless communication device includes transmitting a first downlink rate in a first control message. The first downlink rate is based on a latency of an inter-processor communication link associated with the wireless communication device. First downlink data at the first downlink rate is then received for a first time period. Following the first time period, second downlink data is received at a second downlink rate that is higher than the first downlink rate.

According to one embodiment of the present disclosure, a technique for operating a wireless communication device includes detecting a first event associated with initiation of an operation within the wireless communication device. A first flow control message is then transmitted to reduce a flow rate associated with downlink data to a level below a first downlink rate. An acknowledgement to the first flow control message is then received. The operation is then initiated following the acknowledgement.

According to yet another embodiment of the present disclosure, a technique for operating a base station includes receiving, in a first control message, a first downlink rate that is based on a latency of an inter-processor communication link associated with a subscriber station that is in communication with the base station. First downlink data is then transmitted, for a first time period, at the first downlink rate. Following the first time period, second downlink data is transmitted at a second downlink rate that is higher than the first downlink rate.

With reference to FIG. 1, an example wireless communication system 100 is depicted that includes a serving BS 102 that is in communication with an SS 104. The SS 104 includes a radio modem 106 that includes a processor (P1) 108 that is coupled to a memory subsystem (M1) 110, which includes an application appropriate amount of volatile and non-volatile memory. The memory subsystem 110 may be configured to provide a buffer for buffering information received from the serving BS 102. The processor 108 is coupled, via an inter-processor communication link 111 (e.g., a universal serial bus (USB) link), to a processor (P2) 114 that is included in a block 112, which may be included in the SS 104 or in another system. For example the block 112 may correspond to a computer system (e.g., a notebook computer system or a laptop computer system) and the SS 104 may be a wireless data card that is coupled to the computer system via, for example, a USB port.

Figure 2:
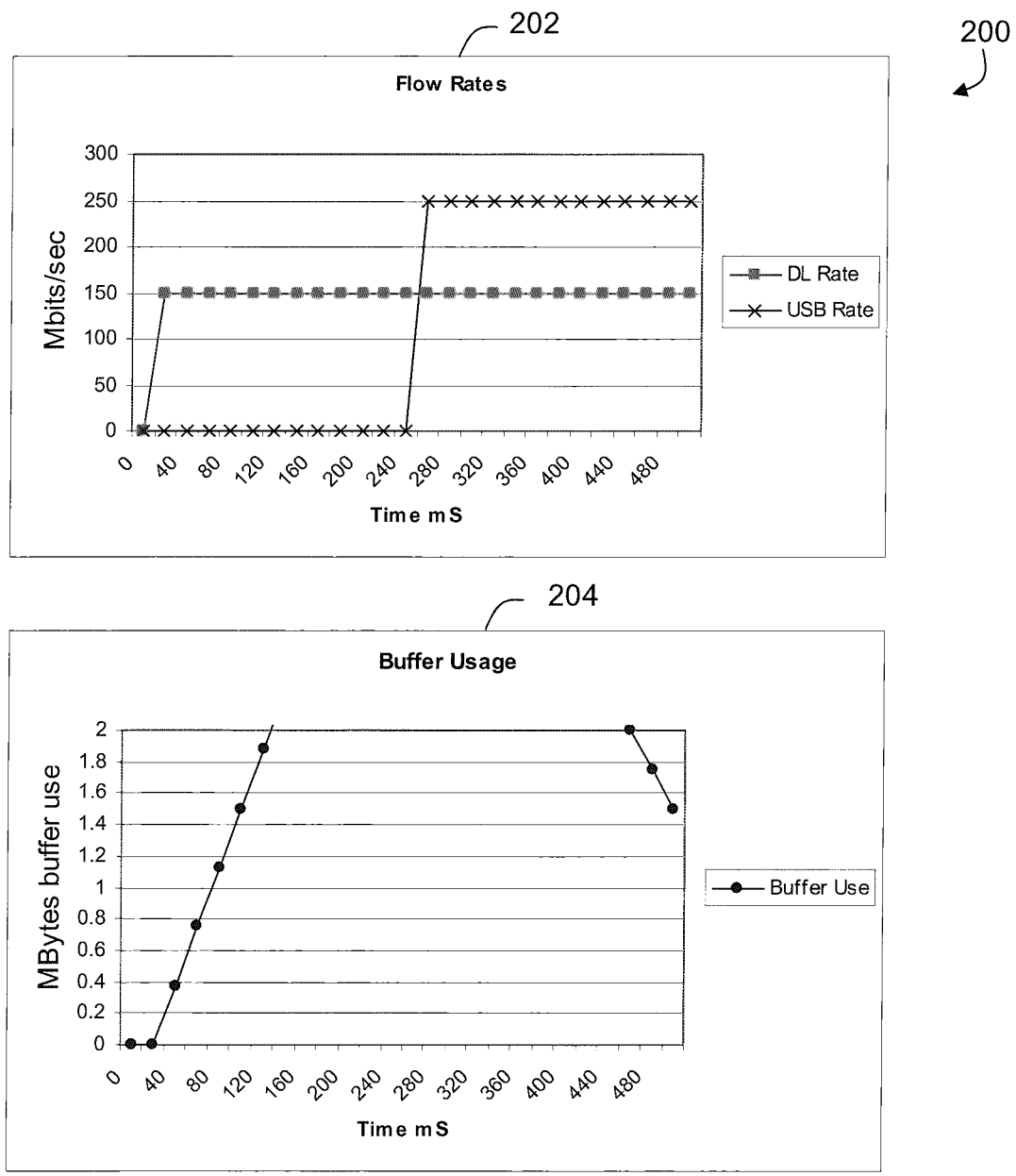
FIG. 2 is an example diagram including charts that compare flow rates and buffer usage associated with a conventional SS that results in buffer overflow.

With reference to FIG. 2, an example diagram 200 includes charts 202 and 204 which illustrate an example conventional communication sequence (that does not utilize flow control) between the SS 104 and the serving BS 102 of FIG. 1. The chart 202 graphs an example maximum downlink rate (DL Rate) and a maximum inter-processor communication link rate (USB Rate) over time and the chart 204 graphs buffer usage over time. In the example diagram 200, a 2 Mbyte buffer is configured in the memory subsystem 110 of the SS 104, the DL Rate is set at 150 Mbits/sec, and the USB Rate is set at 250 Mbits/sec. With reference to the chart 202, at a first time (corresponding to about 20 milliseconds), the serving BS 102 begins transmitting data to the SS 104. With reference to the chart 204, at a second time (corresponding to about 130 milliseconds) the 2 Mbyte buffer overflows as an operating system (OS) that is executing on the processor 114 does not initiate data transfer from the buffer until a third time (corresponding to about 250 milliseconds) due to latency (corresponding to about 230 milliseconds) in setting up the link 111, which in this example is a USB link. While the buffer is eventually emptied following the buffer overflow, data is lost that requires re-transmission of the lost data from the serving BS 102 to the SS 104 due to the latency in setting up the link 111.

Figure 3:
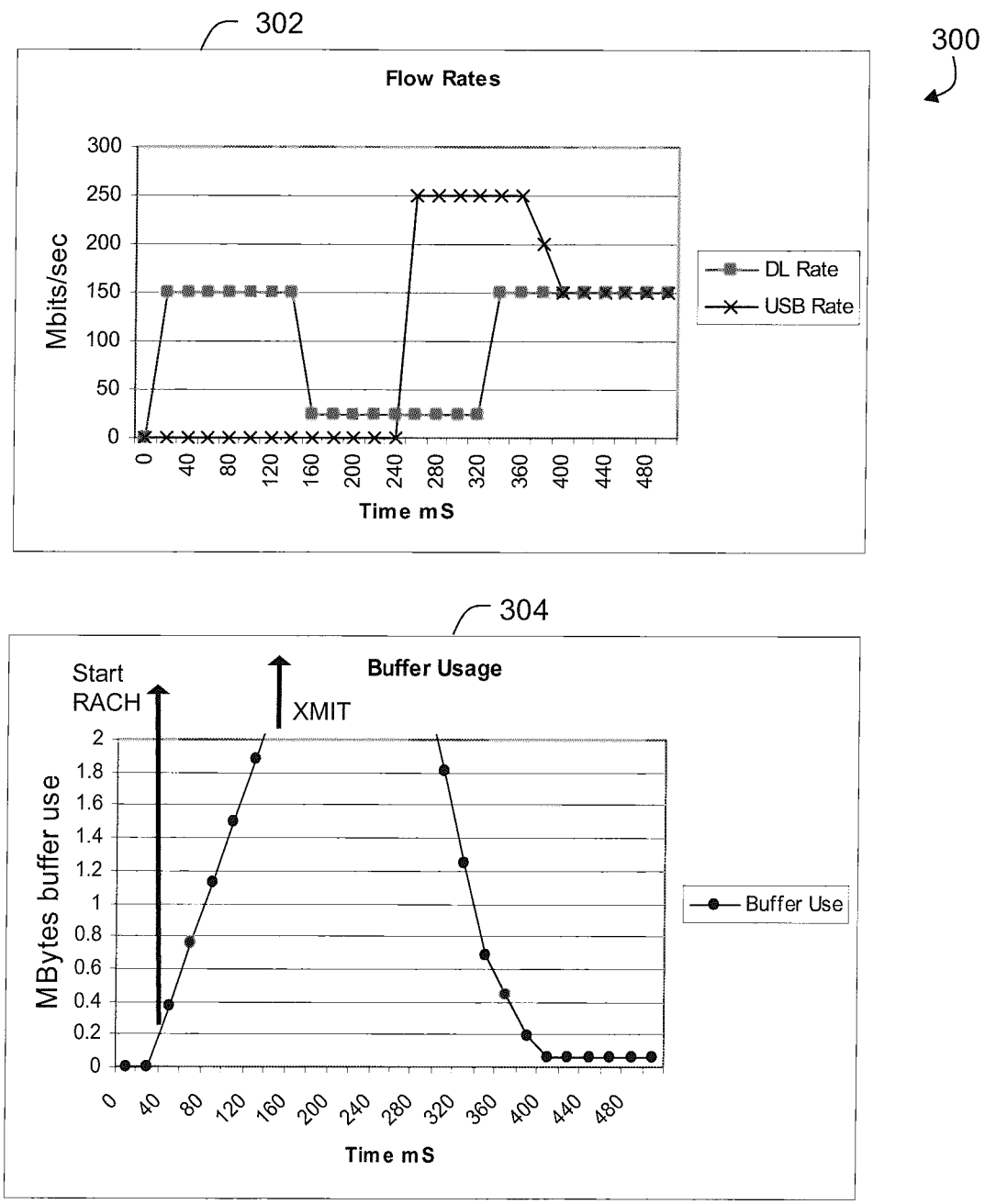
FIG. 3 is another example diagram including charts that compare flow rates and buffer usage associated with a conventional SS that also results in buffer overflow.

With reference to FIG. 3, an example diagram 300 includes charts 302 and 304 which illustrate an example conventional communication sequence (that utilizes flow control) between the SS 104 and the serving BS 102 of FIG. 1. The chart 302 graphs an example downlink rate (DL Rate) and an example inter-processor communication link rate (USB Rate) over time and the chart 304 graphs buffer usage over time. In the example diagram 300, a 2 Mbyte buffer is configured in the memory subsystem 110 of the SS 104, the maximum DL Rate is set at 150 Mbits/sec, and the maximum USB Rate is set at 250 Mbits/sec. With reference to the chart 302, at a first time (corresponding to about 20 milliseconds), the serving BS 102 begins transmitting data to the SS 104. With reference to the chart 304, at a second time (corresponding to about 40 milliseconds) a flow control message is placed in a transmit queue and a RACH procedure is initiated.

At a third time (corresponding to about 130 milliseconds) the 2 Mbyte buffer overflows as the flow control message is still queued and has not been transmitted to the serving BS 102 and an operating system (OS) that is executing on the processor 114 has not initiated data transfer from the buffer. At a fourth time (corresponding to about 140 milliseconds) the SS 104 transmits the queued flow control message to the serving BS 102 and the serving BS 102 reduces the downlink rate to about 25 Mbits/sec. At a fifth time (corresponding to about 250 milliseconds) the processor 114 initiates data transfer from the buffer via the link 111, which in this example is a USB link. In this example, the latency in setting up the link 111 is about 230 milliseconds. While the buffer is eventually emptied following the buffer overflow, data is lost that requires re-transmission of the lost data from the serving BS 102 to the SS 104 due to the latency in setting up the link 111.

Figure 4:
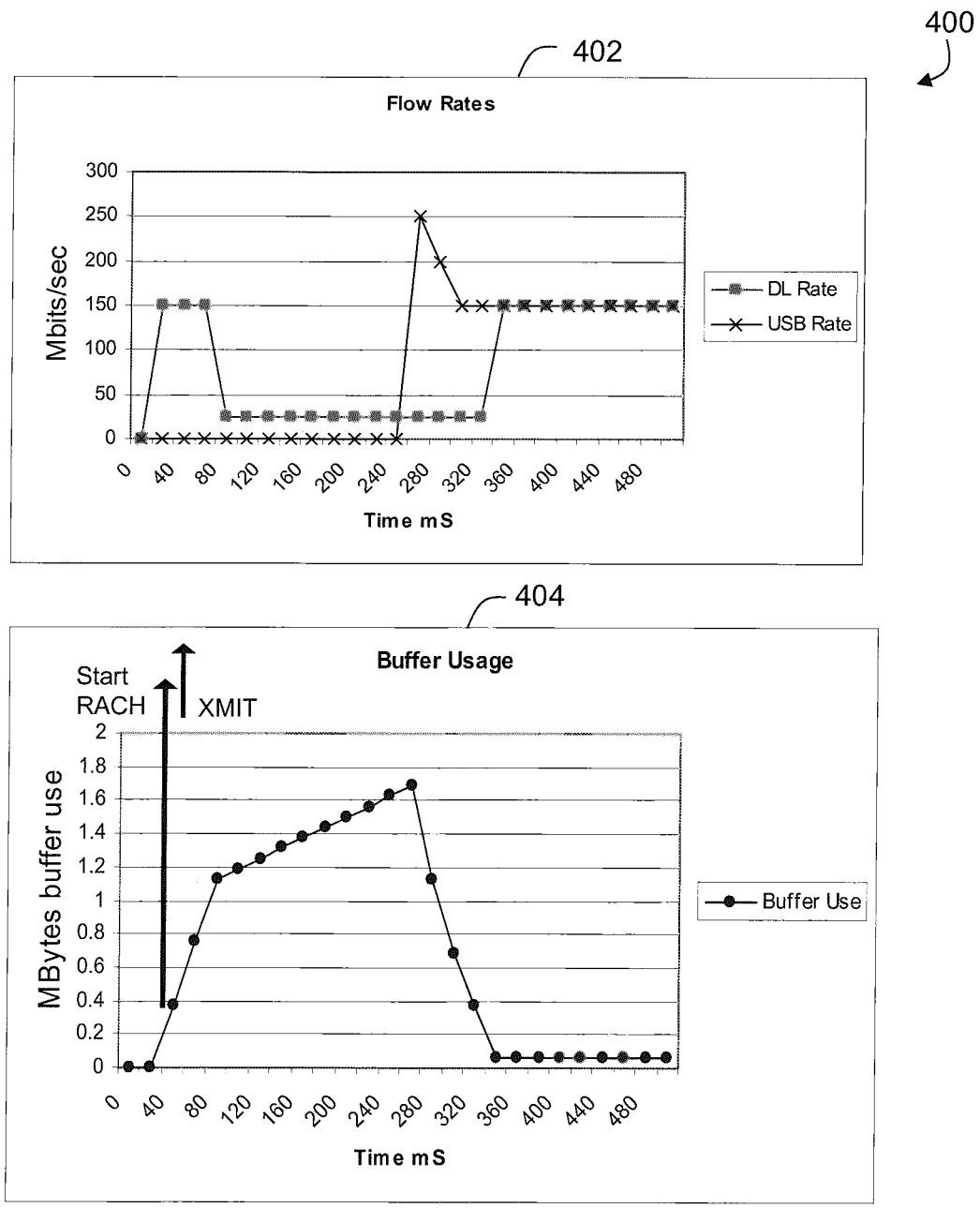
FIG. 4 is yet another example diagram including charts that compare flow rates and buffer usage associated with a conventional SS that does not result in buffer overflow.

With reference to FIG. 4, an example diagram 400 includes charts 402 and 404 which illustrate an example conventional communication sequence (that also utilizes flow control and in this case avoids buffer overflow) between the SS 104 and the serving BS 102 of FIG. 1. It should be appreciated that avoiding buffer overflow using the conventional communication sequence illustrated in FIG. 4 is atypical as an average UL delay using the RACH procedure is about 100 milliseconds. The chart 402 graphs an example downlink rate (DL Rate) and an example inter-processor communication link rate (USB Rate) over time and the chart 404 graphs buffer usage over time. In the example diagram 400, a 2 Mbyte buffer is configured in the memory subsystem 110 of the SS 104, the maximum DL Rate is set at 150 Mbits/sec, and the maximum USB Rate is set at 250 Mbits/sec.

With reference to the chart 402, at a first time (corresponding to about 20 milliseconds), the serving BS 102 begins transmitting data (at 150 Mbits/sec) to the SS 104. With reference to the chart 404, at a second time (corresponding to about 50 milliseconds) a flow control message is placed in a transmit queue and a RACH procedure is initiated. At a third time (corresponding to about 80 milliseconds) the flow control message is transmitted from the SS 104 to the serving BS 102 and the DL rate is reduced by the serving BS 102 avoiding overflow of the 2 Mbyte buffer. At a fourth time (corresponding to about 250 milliseconds) the processor 114 initiates data transfer from the buffer via the link 111, which in this example is a USB link. In this example, the latency in setting up the link 111 is about 230 milliseconds. In this situation, due to the relatively short time delay in obtaining an uplink grant (for the flow control message) using the RACH procedure, buffer overflow is avoided and no data is lost that requires re-transmission due to the latency in setting up the link 111.

Figure 5:
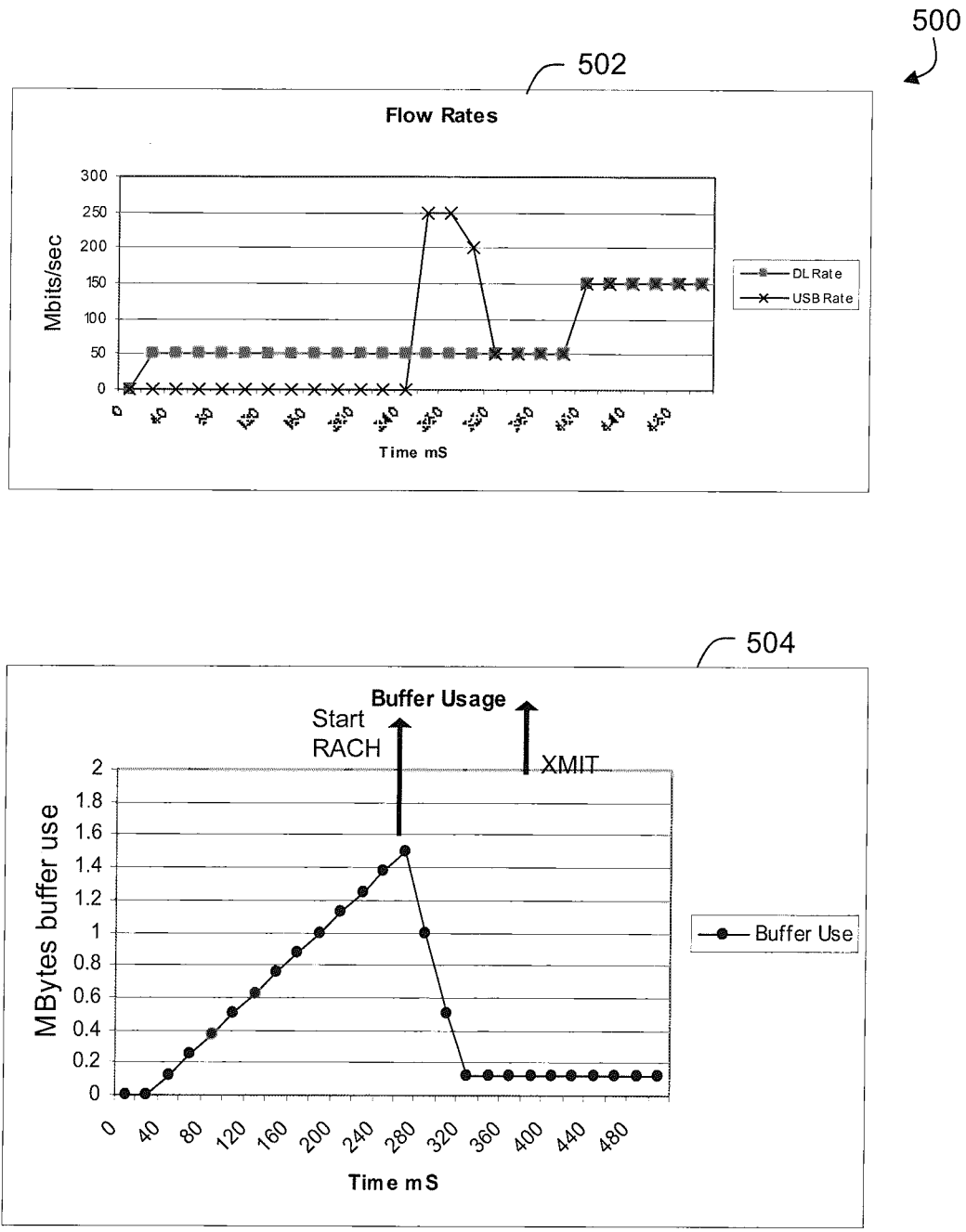
FIG. 5 is an example diagram including charts that compare flow rates and buffer usage associated with an SS configured, according to various aspects of the present disclosure, to reduce the occurrence of buffer overflow.

With reference to FIG. 5, an example diagram 500 includes charts 502 and 504 which illustrate an example communication sequence between the SS 104 and the serving BS 102 of FIG. 1, according to various embodiments of the present disclosure. It should be appreciated that avoiding buffer overflow by initiating a lower initial downlink rate (provided by an SS) decreases the number of packets that require re-transmission. The chart 502 graphs an example downlink rate (DL Rate) that begins at an initial downlink rate (of 50 Mbits/sec) and transitions to a maximum downlink rate (of 150 Mbits/sec) and an example maximum inter-processor communication link rate (USB Rate) over time and the chart 504 graphs buffer usage over time. In the example diagram 500, a 2 Mbyte buffer is configured in the memory subsystem 110 of the SS 104, the initial DL Rate is set at 50 Mbits/sec, the maximum DL Rate is set at 150 Mbits/sec, and the maximum USB Rate is set at 250 Mbits/sec.

With reference to the chart 502, at a first time (corresponding to about 20 milliseconds), the serving BS 102 begins transmitting data to the SS 104 at the initial downlink rate. With reference to the chart 504, at a second time (corresponding to about 250 milliseconds) the processor 114 initiates data transfer from the buffer via the link 111, which in this example is a USB link. At a third time (corresponding to about 260 milliseconds) a flow control message is placed in a transmit queue and a RACH procedure is initiated. At a fourth time (corresponding to about 380 milliseconds) the flow control message is transmitted (in an assigned uplink channel) from the SS 104 to the serving BS 102 and the DL rate is increased (in response to the flow control message) by the serving BS 102 to, for example, a maximum downlink rate. In this example, the latency in setting up the link 111 is about 230 milliseconds. In this situation, due to the lower initial downlink rate, buffer overflow is avoided and no data is lost that requires re-transmission due to the latency in setting up the link 111. In an alternative embodiment, the transmission of the flow control message to increase the flow rate may omitted assuming that an initial downlink rate duration parameter is employed in conjunction with the initial downlink rate parameter.

Figure 6:
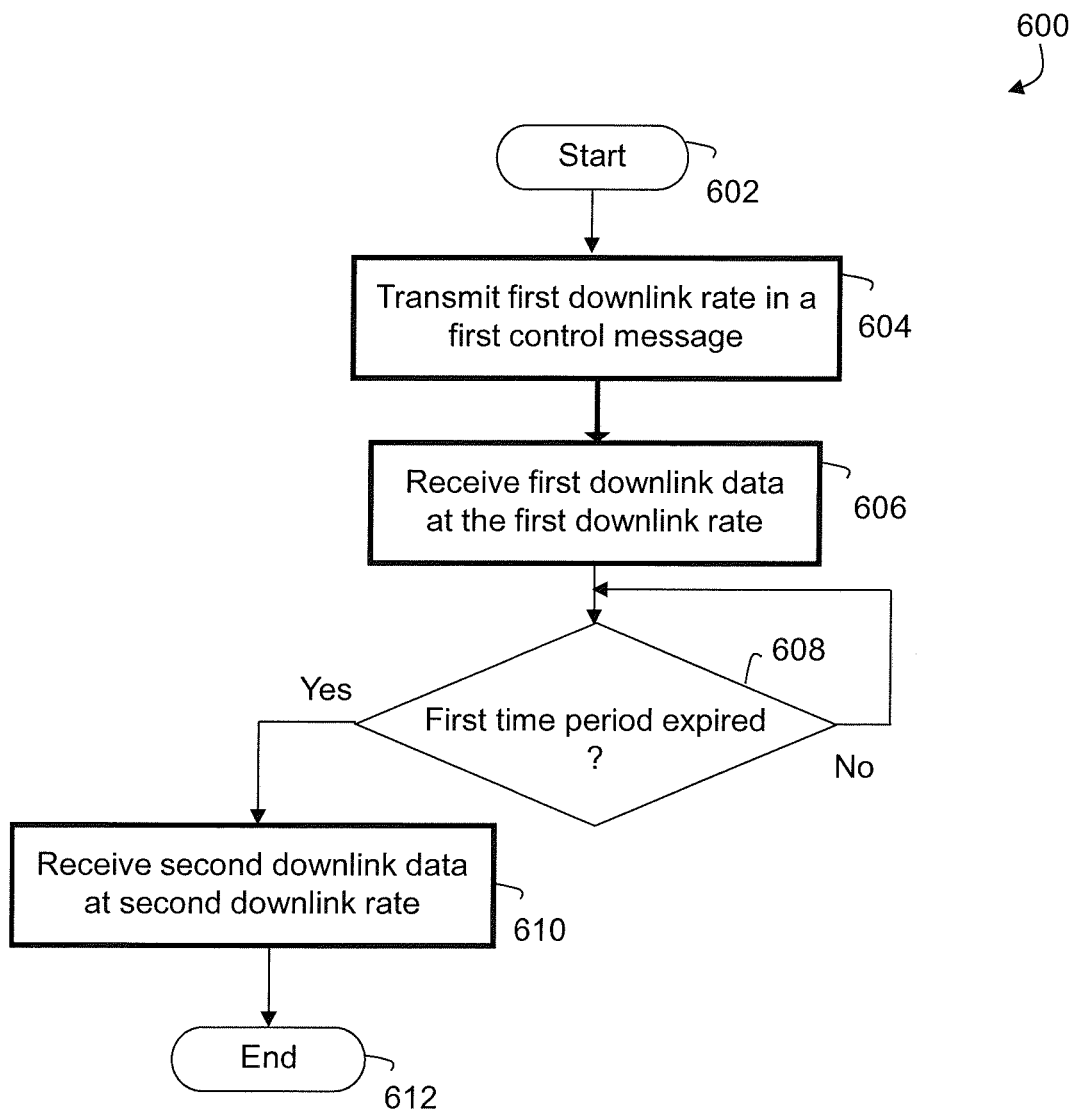
FIG. 6 is a flowchart of an example buffer overflow reduction routine, according to one embodiment of the present disclosure.

Turning to FIG. 6, an example buffer overflow reduction routine 600 is depicted that is configured to reduce buffer overflow in a communication system, according to one aspect of the present disclosure. The routine 600, which may be employed in an SS, is initiated at block 602, at which point control transfers to block 604. In block 604, the SS transmits a first downlink rate (that is based on a latency of an inter-processor communication link of the SS, which is known to the SS) to the BS in a first control message. As noted above, the inter-processor communication link may be completely internal to the SS or may couple the SS to an external device. For example, the SS may be a wireless data card (e.g., in a personal computer memory card international association (PCMCIA) form factor) that is coupled to a computer system (via a communication link such as a USB interface, an IEEE 1394 interface, etc.).

The first downlink rate corresponds to an initial downlink rate that is lower than a maximum downlink rate. The first control message (which may include, for example, a device category, an initial downlink rate, and an initial downlink rate duration) may be provided (from the SS) to the BS in response to an SS capability inquiry from the BS (e.g., at the time of connection establishment). Alternatively, the first control message may correspond to an RRC message or other message. The first downlink rate (e.g., 5 Mbits/sec) may, for example, be provided as a capability parameter of an SS category in the first control message. Then, in block 606, the SS receives (from the BS) first downlink data at the first downlink rate. Next, in decision block 608, the SS determines whether a first time period has expired. The first time period (e.g., 750 milliseconds) may, for example, be provided as another capability parameter of the SS category in the first control message. If the first time period has not expired, control loops on block 608 until the first time period expires. When the first time period expires in block 608, control transfers to block 610 where the SS receives (from the BS) second downlink data at a second downlink rate (e.g., a maximum downlink rate). Following block 610, control transfers to block 612 where control returns to a calling routine.

Figure 7:
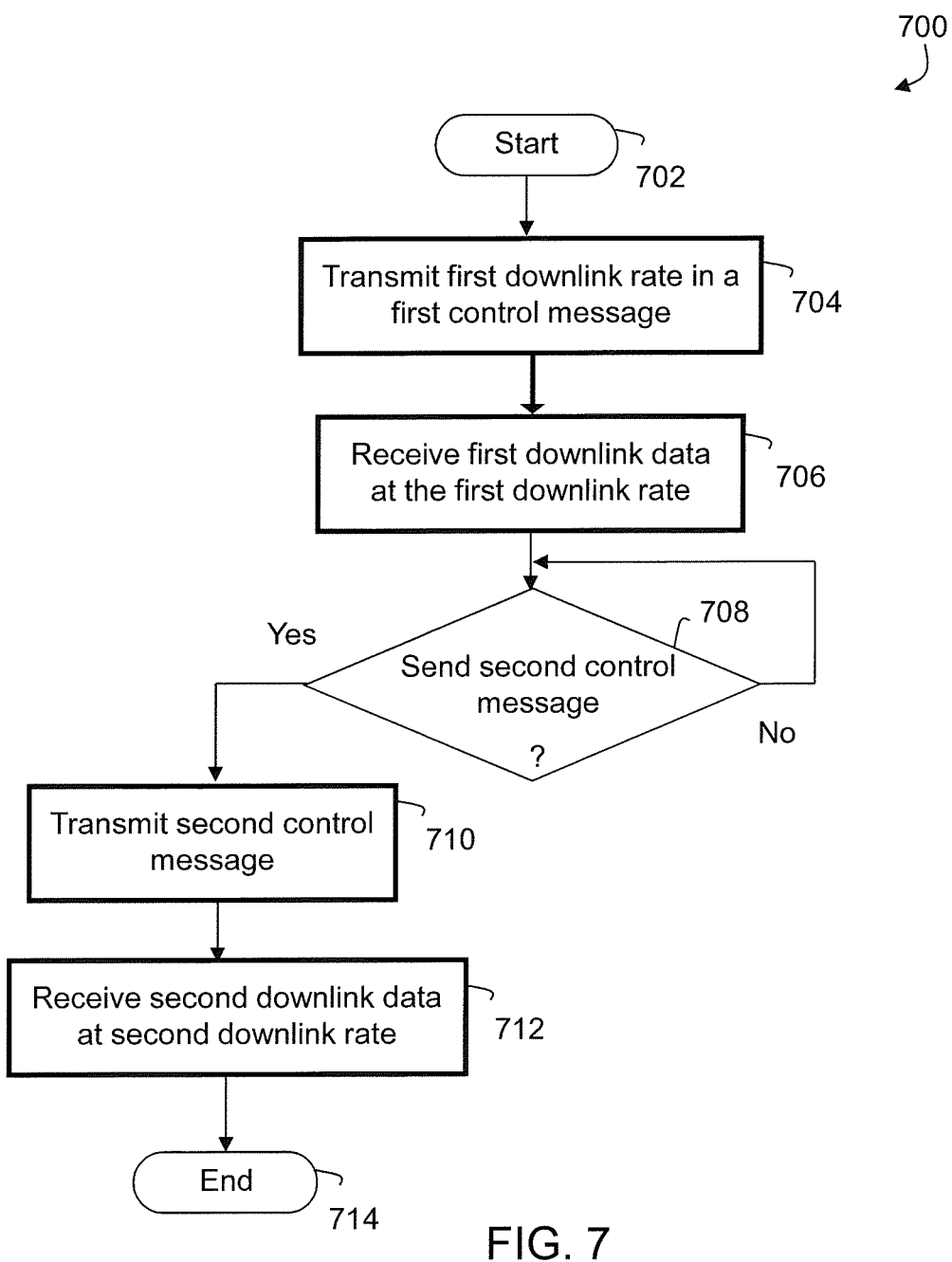
FIG. 7 is a flowchart of an example buffer overflow reduction routine, according to another embodiment of the present disclosure.

Turning to FIG. 7, an example buffer overflow reduction routine 700 is depicted that is configured to reduce buffer overflow in a communication system, according to another aspect of the present disclosure. The routine 700, which may be employed in an SS, is initiated at block 702, at which point control transfers to block 704. In block 704, the SS transmits a first downlink rate (that is based on a latency of an inter-processor communication link of the SS) to a serving BS in a first control message. As noted above, the inter-processor communication link may be completely internal to the SS or may connect the SS to an external device. The first downlink rate corresponds to an initial downlink rate that is lower than a maximum downlink rate. The first control message (which may include, for example, a device category, an initial downlink rate, and an initial downlink rate duration) may be provided (from the SS) to the BS in response to an SS capability inquiry from the BS (at the time of connection establishment). Alternatively, the first control message may correspond to an RRC message or other message. Then, in block 706, the SS receives (from the BS) first downlink data at the first downlink rate. The first downlink rate (e.g., 10 Mbits/sec) may, for example, be provided as a capability parameter of an SS category in the first control message.

Next, in decision block 708, the SS determines whether a second control message should be transmitted to increase a downlink rate. In determining whether the second control message should be transmitted, the SS may monitor buffer utilization, a counter, or the inter-processor communication link to determine if the link is set-up and active. At any rate, until the SS determines that the second control message should be transmitted, control loops on block 708. When the SS determines that the second control message should be transmitted in block 708, control transfers to block 710 where the SS transmits the second control message (to affect an increase in the downlink rate). Next, in block 712, the SS receives second downlink data at the second downlink rate (e.g., a maximum downlink rate). Following block 712, control transfers to block 714 where control returns to a calling routine.

Figure 8:
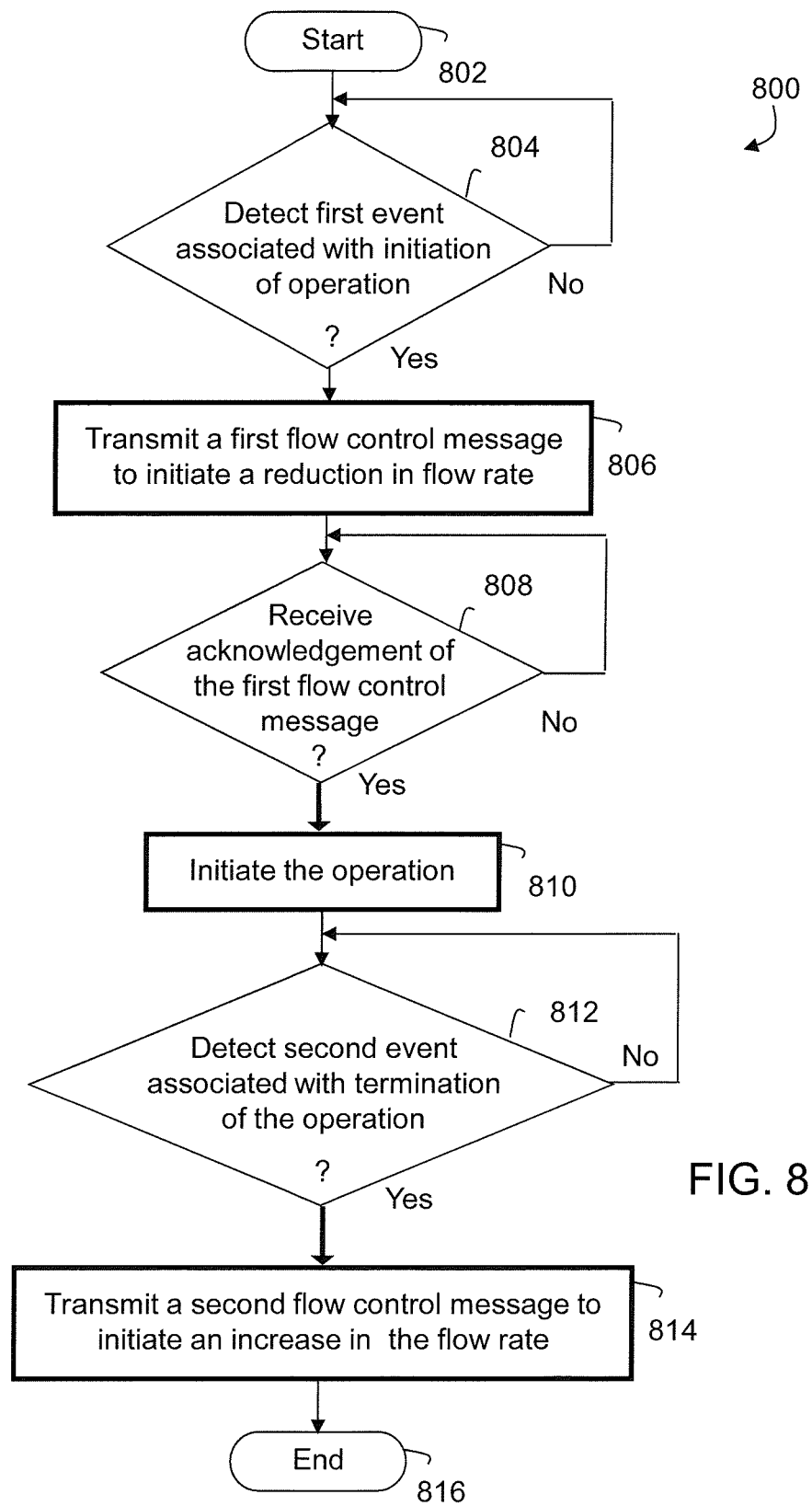
FIG. 8 is a flowchart of an example buffer overflow reduction routine, according to yet another embodiment of the present disclosure.

Turning to FIG. 8, another example buffer overflow reduction routine 800 is depicted that is configured to reduce buffer overflow in a communication system, according to another aspect of the present disclosure. The routine 800, which may be employed in an SS, is initiated at block 802, at which point control transfers to decision block 804. In block 804, the SS determines whether a first event associated with initiation of an operation on the SS is detected. The operation may correspond to a resource-taxing operation that prevents the SS from also being able to adequately service a current downlink rate without buffer overflow. Initiation of an operation may correspond to, for example, a user of the SS activating a button associated with an integrated camera to capture a picture. When an event is not detected in block 804, control loops on block 804. When an event is detected in block 804, control transfers to block 806.

In block 806, the SS transmits a first flow control message (after receiving an uplink grant using, for example, a RACH procedure) to initiate a reduction in flow rate. Next, in decision block 808, when the SS has not yet received an acknowledgement to the first flow control message control loops on block 808. When an acknowledgement is received in block 808, control transfers to block 810 where the operation is initiated. In an alternative embodiment, block 808 is omitted and the operation is initiated when the first flow control message is transmitted. Then, in decision block 812, the SS determines whether a second event (e.g., associated with termination of the operation) is detected. Control loops on block 812 until the second event is detected. When the second event is detected in block 812, control transfers to block 814, where the SS transmits a second flow control message to initiate an increase in the flow rate (e.g., to a maximum downlink rate). Following block 814, control transfers to block 816 where control returns to a calling routine.

Figure 9:
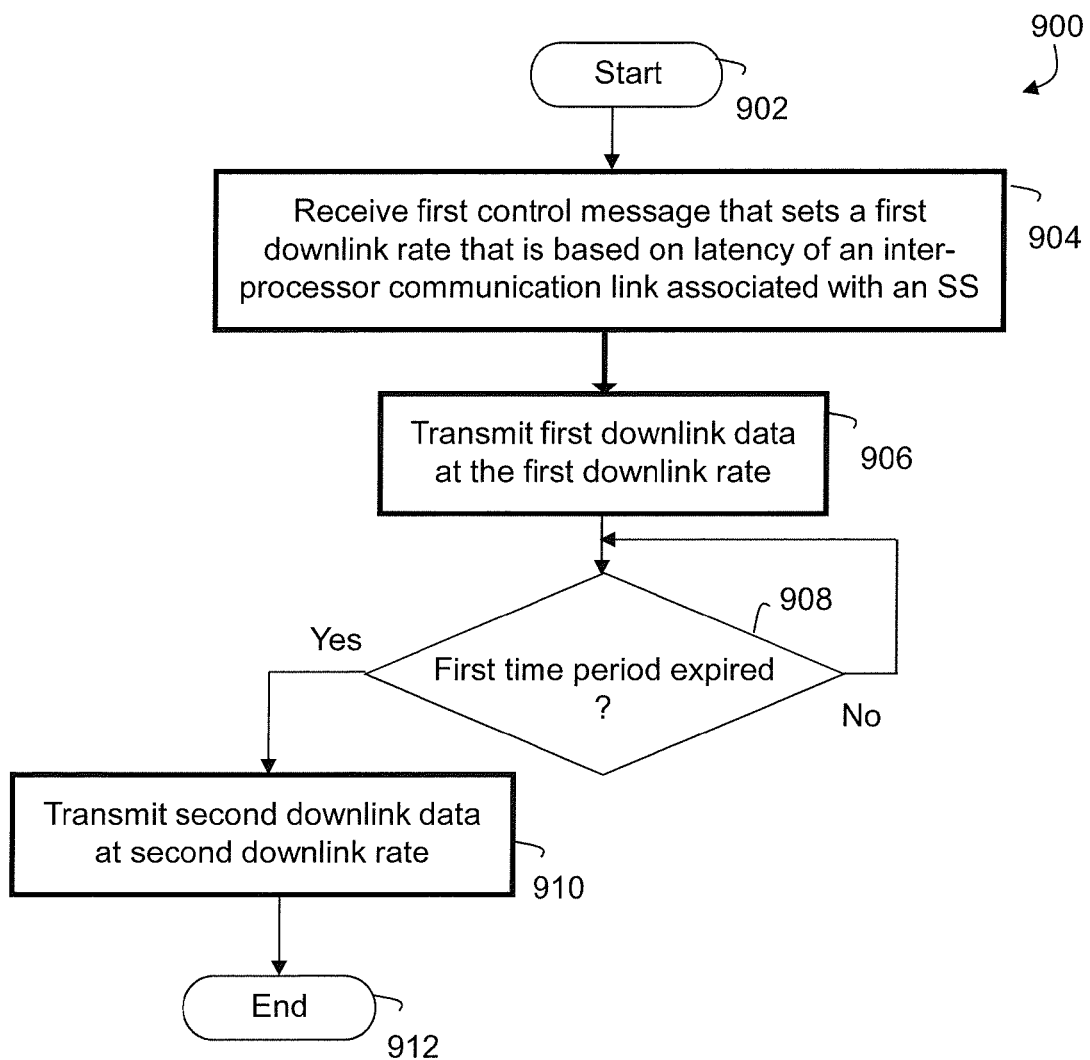
FIG. 9 is a flowchart of an example buffer overflow reduction routine, according to one aspect of the present disclosure.

Moving to FIG. 9, an example buffer overflow reduction routine 900 is depicted that is configured to reduce buffer overflow in a communication system, according to one aspect of the present disclosure. The routine 900, which may be employed in a serving BS, is initiated at block 902, at which point control transfers to block 904. In block 904, the BS receives a first control message (e.g., an SS capability message transmitted in response to an SS capability inquiry, an RRC message, or another message) that sets a first downlink rate that is based on a latency of an inter-processor communication link of an SS that is being served by the BS. The inter-processor communication link may be completely internal to the SS or may connect the SS to an external device. For example, the SS may be a wireless data card (e.g., in a PCM-CIA form factor) that is coupled to a computer system (via a communication link such as a USB interface, an IEEE 1394 interface, etc.).

Next, in block 906, the BS transmits first downlink data at the first downlink rate (corresponds to an initial downlink rate that is lower than a maximum downlink rate). The first downlink rate (e.g., 50 Mbits/sec) may, for example, be provided as a capability parameter of an SS category in the first control message. Then, in decision block 908, the BS determines whether a first time period has expired. The first time period (e.g., 750 milliseconds) may, for example, be provided as another capability parameter of the SS category in the first control message. If the first time period has not expired, control loops on block 908 until the first time period expires. When the first time period expires in block 908, control transfers to block 910 where the BS transmits second downlink data at a second downlink rate (e.g., a maximum downlink rate). Following block 910, control transfers to block 912 where control returns to a calling routine.

Figure 10:
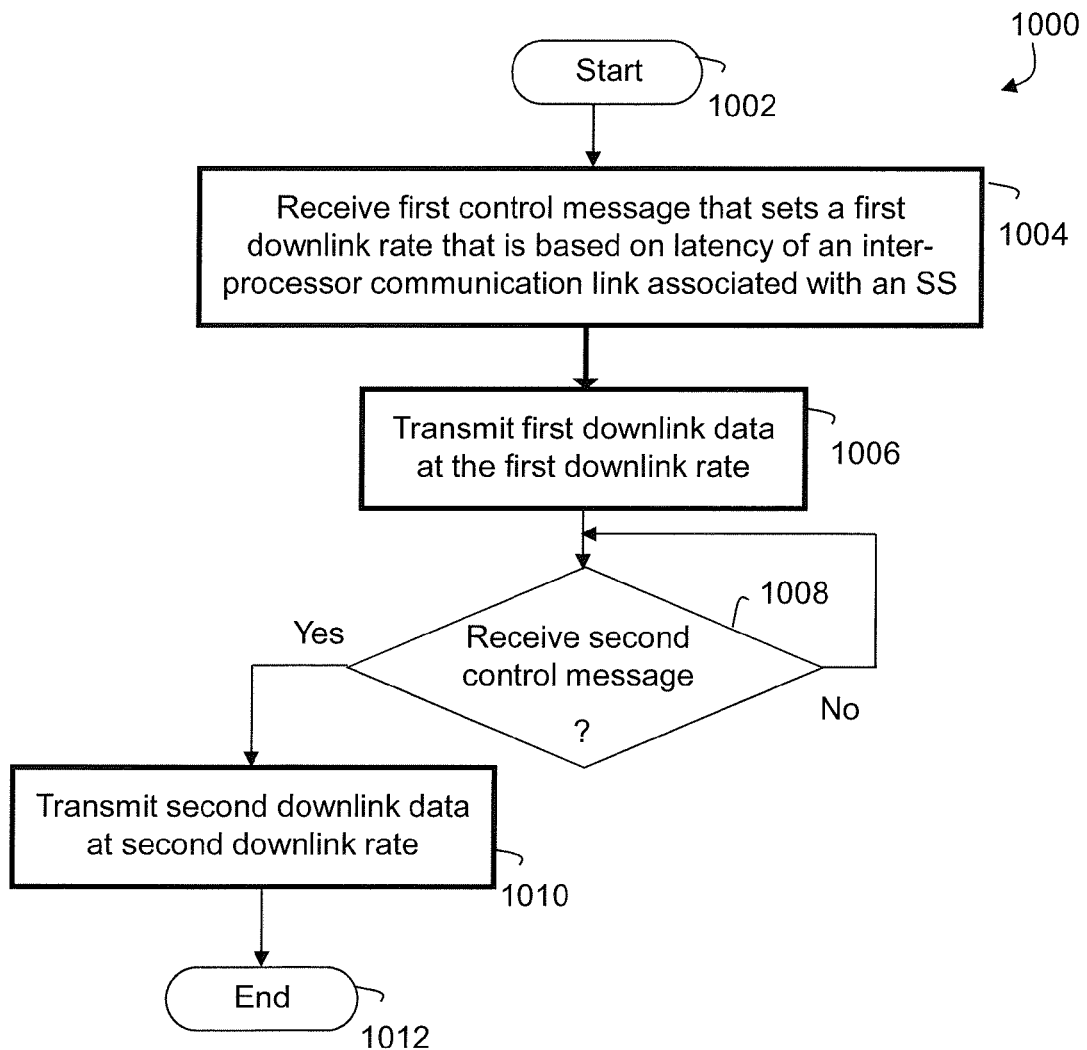
FIG. 10 is a flowchart of an example buffer overflow reduction routine, according to another aspect of the present disclosure.

With reference to FIG. 10, an example buffer overflow reduction routine 1000 is depicted that is configured to reduce buffer overflow in a communication system, according to another aspect of the present disclosure. The routine 1000, which may be employed in serving BS, is initiated at block 1002, at which point control transfers to block 1004. In block 1004, the BS receives a first control message that sets a first downlink rate that is based on a latency of an inter-processor communication link of a served SS. As noted above, the inter-processor communication link may be completely internal to the SS or may connect the SS to an external device.

Next, in block 1006, the BS transmits first downlink data at the first downlink rate (corresponds to an initial downlink rate that is lower than a maximum downlink rate) to the SS. The first downlink rate (e.g., 25 Mbits/sec) may, for example, be provided as a capability parameter of an SS category in the first control message. Then, in decision block 1008, the BS determines whether a second control message (that indicates a downlink rate should be increased) has been received. Control loops on block 1008, until the BS receives the second control message. When the BS receives the second control message in block 1008, control transfers to block 1010 where the BS transmits second downlink data at a second downlink rate (e.g., a maximum downlink rate). Following block 1010, control transfers to block 1012 where control returns to a calling routine.

Figure 11:
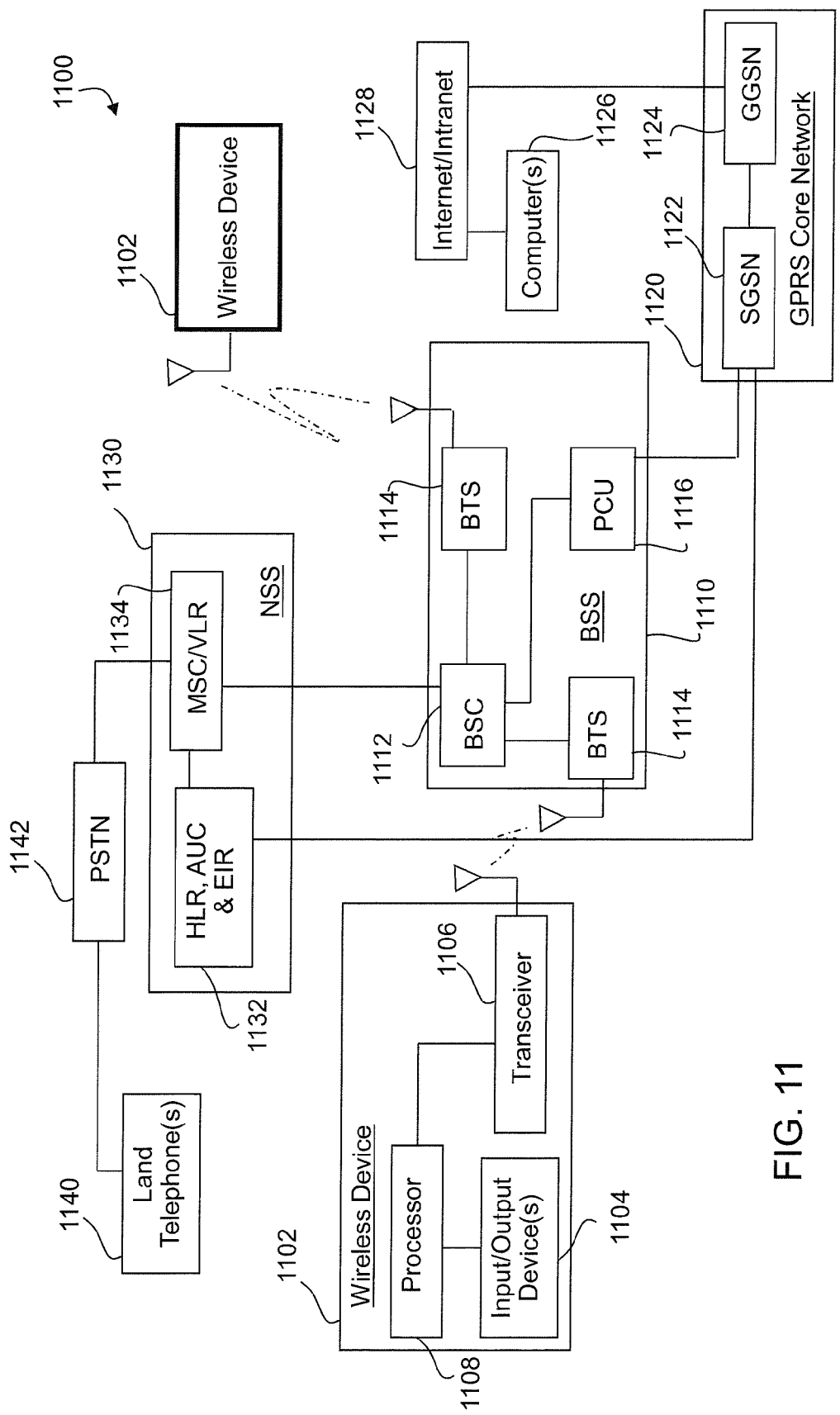
FIG. 11 is a block diagram of an example wireless communication system that may be configured to reduce buffer overflow according to various embodiments of the present disclosure.

With reference to FIG. 11, an example wireless communication system 1100 is depicted that includes a plurality of subscriber stations or wireless devices 1102, e.g., hand-held computers, personal digital assistants (PDAs), cellular telephones, etc., that may implement communication links according to one or more embodiments of the present disclosure. In general, the wireless devices 1102 include a processor 1108 (e.g., a digital signal processor (DSP)), a transceiver 1106, a memory subsystem (not shown in FIG. 11) and one or more input/output devices 1104 (e.g., a camera, a keypad, display, etc.), among other components not shown in FIG. 11. The wireless devices 1102 may also include one or more application processors (not shown in FIG. 11) that are coupled to the processor 1108 via an inter-processor communication link (see FIG. 1). In general, the wireless devices 1102 are configured to reduce buffer overflow. The wireless devices 1102 communicate with a base station controller (BSC) 1112 of a base station subsystem (BSS) 1110, via one or more base transceiver stations (BTS) 1114, to receive or transmit voice and/or data and to receive control signals. The BSC 1112 may, for example, employ a scheduler for scheduling uplink grants and downlink assignments to each of the wireless devices 1102. In general, the BSC 1112 may also be configured to choose a modulation and coding scheme (MCS) for each of the devices 1102, based on channel conditions.

The BSC 1112 is also in communication with a packet control unit (PCU) 1116, which is in communication with a serving general packet radio service (GPRS) support node (SGSN) 1122. The SGSN 1122 is in communication with a gateway GPRS support node (GGSN) 1124, both of which are included within a GPRS core network 1120. The GGSN 1124 provides access to computer(s) 1126 coupled to Internet/intranet 1128. In this manner, the wireless devices 1102 may receive data from and/or transmit data to computers coupled to the Internet/intranet 1128. For example, when the devices 1102 include a camera, images may be transferred to a computer 1126 coupled to the Internet/intranet 1128 or to another one of the devices 1102. The BSC 1112 is also in communication with a mobile switching center/visitor location register (MSC/VLR) 1134, which is in communication with a home location register (HLR), an authentication center (AUC), and an equipment identity register (EIR) 1132. In a typical implementation, the MSC/VLR 1134 and the HLR, AUC, and EIR 1132 are located within a network and switching subsystem (NSS) 1130, which performs various functions for the system 1100. The SGSN 1122 may communicate directly with the HLR, AUC, and EIR 1132. As is also shown, the MSC/VLR 1134 is in communication with a public switched telephone network (PSTN) 1142, which facilitates communication between wireless devices 1102 and land telephone(s) 1140.

Accordingly, techniques have been disclosed herein that employ one or more additional SS capability parameters to reduce the occurrence of buffer overflow in an SS. Implementing an SS capability parameter that specifies an initial downlink rate generally reduces (or avoids) the occurrence of buffer overflow. In one embodiment, an SS signals, using a flow control message, a serving BS when the SS is ready to accept a higher (e.g., maximum) downlink rate (as indicated by the SS category parameter). According to another embodiment, another additional SS capability parameter may be employed that specifies a duration of the initial downlink rate.

As used herein, a software system can include one or more objects, agents, threads, subroutines, separate software applications, two or more lines of code or other suitable software structures operating in one or more separate software applications, on one or more different processors, or other suitable software architectures.

As will be appreciated, the processes in preferred embodiments of the present invention may be implemented using any combination of computer programming software, firmware, or hardware. As a preparatory step to practicing the invention in software, the computer programming code (whether software or firmware) according to a preferred embodiment will typically be stored in one or more machine readable storage mediums such as fixed (hard) drives, diskettes, optical disks, magnetic tape, semiconductor memories such as read-only memories (ROMs), programmable ROMs (PROMs), etc., thereby making an article of manufacture in accordance with the invention. The article of manufacture containing the computer programming code is used by either executing the code directly from the storage device or by copying the code from the storage device into another storage device such as a hard disk, random access memory (RAM), etc. The method form of the invention may be practiced by combining one or more machine-readable storage devices containing the code according to the present invention with appropriate standard computer hardware to execute the code contained therein. An apparatus for practicing the invention could be one or more processors and storage systems containing or having access to computer program(s) coded in accordance with the invention.

Although the invention is described herein with reference to specific embodiments, various modifications and changes can be made without departing from the scope of the present invention as set forth in the claims below. For example, many of the techniques disclosed herein are broadly applicable to a variety of communication systems. Accordingly, the specification and figures are to be regarded in an illustrative rather than a restrictive sense, and all such modifications are intended to be included with the scope of the present invention. Any benefits, advantages, or solution to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method of operating a wireless communication device, comprising:
    detecting a first event associated with an initiation of an operation on the wireless communication device, where the operation prevents the wireless communication device from being able to service a current downlink rate;
    delaying the initiation of the operation by at least enabling a software interlock; and
    when the first event is detected:
        transmitting a first flow control message after receiving an uplink grant to initiate a reduction in the current downlink rate;
        receiving an acknowledgement of the first flow control message; and
        based at least in part on the receiving of the acknowledgement, initiating the operation by at least disabling the software interlock.

2. The method of claim 1 further comprising:
    detecting a second event associated with a termination of the operation; and
    based on at least the detecting, transmitting a second flow control message to initiate an increase in a flow rate.

3. The method of claim 2, wherein the increase in the flow rate comprises an increase in the flow rate to the current downlink rate.

4. The method of claim 2, wherein the increase in the flow rate comprises an increase in the flow rate to a maximum downlink rate.

5. The method of claim 1, wherein the uplink grant comprises a Random Access Channel (RACH) procedure.

6. The method of claim 1, wherein the reduction in the current downlink rate is based, at least in part, on a latency of an inter-processor communication link coupling at least a first processor and a second processor of the wireless communication device.

7. The method of claim 1, wherein the ability to service a current downlink rate comprises the ability to support the current downlink rate without buffer overflow.

8. A computer readable apparatus for use with a wireless communication device, wherein the computer readable apparatus comprises a non-transitory storage medium with at least one computer program stored thereon, the at least one computer program configured to, when executed by a processor in data communication with a wireless interface, cause the wireless communication device to:
    detect a first event associated with initiation of an operation for the wireless communication device;
    delay the initiation of the operation by at least enabling a software interlock; and
    based at least in part on the detection:
        transmit a first flow control message after receiving an uplink grant to initiate a reduction in a current downlink rate;

receive an acknowledgement of the first flow control message; and based on the reception of the acknowledgement, initiate the operation by at least disabling the software interlock.

9. The computer readable apparatus of claim 8, wherein the operation prevents the wireless communication device from being able to service the current downlink rate without buffer overflow.

10. The computer readable apparatus of claim 8 wherein the at least one computer program is further configured to:

detect a second event associated with a termination of the operation; and based on at least the detection, transmit a second flow control message to initiate an increase in a flow rate.

11. The computer readable apparatus of claim 10, wherein the increase in the flow rate is to the current downlink rate.

12. The computer readable apparatus of claim 10, wherein the increase in the flow rate comprises an increase to a maximum downlink rate.

13. The computer readable apparatus of claim 8, wherein the reduction in the current downlink rate is based, at least in part, on a latency of an inter-processor communication link.

* * * * *